Figure 1:
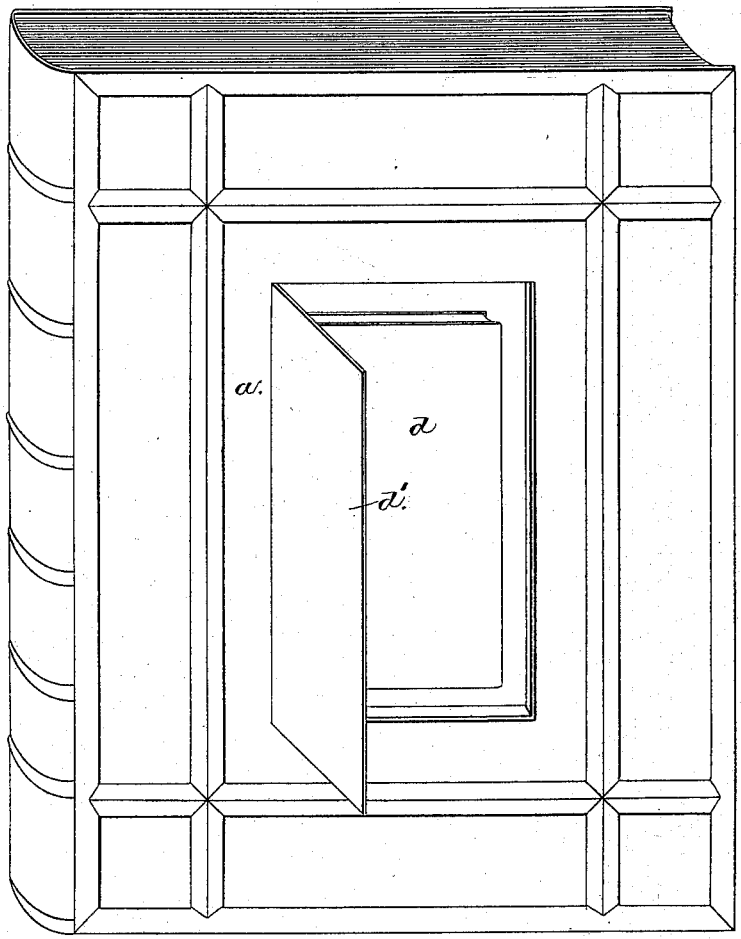

(No Model.) 2 Sheets—Sheet 1.

T. KELLY.
BOOK COVER.

No. 384,697. Patented June 19, 1888.

Witnesses.
Fred L. Emery
John F. C. Prinkert

Inventor:
Thomas Kelly.
By Crosby & Gregory.
Attys.

(No Model.) 2 Sheets—Sheet 2.
T. KELLY.
BOOK COVER.
No. 384,697. Patented June 19, 1888.
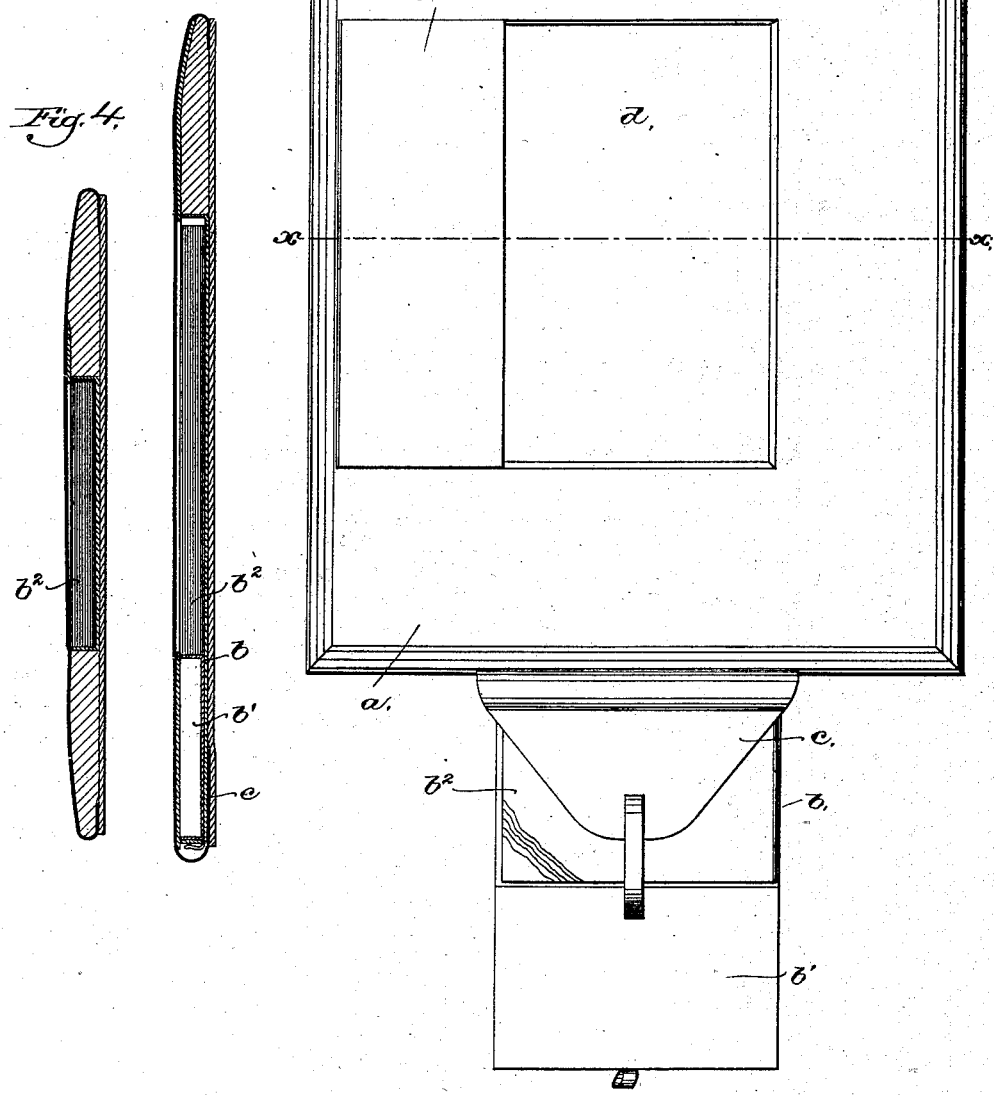
Witnesses
Fred L. Emery,
John F. C. Prinkert
Inventor
Thomas Kelly
by Crosby & Gregory attys

UNITED STATES PATENT OFFICE.

THOMAS KELLY, OF NEW YORK, N. Y.

BOOK-COVER.

SPECIFICATION forming part of Letters Patent No. 384,697, dated June 19, 1888.

Application filed December 15, 1886. Serial No. 221,615. (No model.)

*To all whom it may concern:*

Be it known that I, THOMAS KELLY, of New York, county of New York, and State of New York, have invented an Improvement in Book-Covers, of which the following description, in connection with the accompanying drawings, is a specification, like letters on the drawings representing like parts.

This invention has for its object to provide a book-cover with a box or receptacle to contain souvenirs and the like, and with an opening at the end of the cover to gain access to the said box or receptacle, and a tongue to conceal the opening; also a lid at the outside of the cover to expose the box or receptacle; and the invention consists in various details of construction to be hereinafter pointed out in the claims.

Figure 1 shows in perspective a book the cover of which is provided with a box and an outside lid to obtain access to the same; Fig. 2, a front view of the cover, the outside lid being partially open and the box shown as partially withdrawn; Fig. 3, a vertical section of the cover and its inclosed box; and Fig. 4, a cross-section of the cover taken on the dotted line $x$ $x$, Fig. 2.

The cover $a$ is of any usual shape, size, and material—that depending upon the book to which the same is to be applied—it preferably being quite thick, as shown in sectional views, Figs. 3 and 4.

A sufficient space or aperture is formed within the cover $a$ to receive the box or receptacle $b$. This drawer $b$ may be placed within the space or aperture made for it from either the inside or outside of the cover, or it may be inserted at the end of the cover. I have in this instance inserted the box or receptacle $b$ at the lower end of the cover $a$, such lower end having a suitable opening to receive it. The opening at the lower end of the cover is closed by an overlapping tongue, $c$, preferably made of the same material as the exterior covering of the cover $a$, such tongue $c$ entering a slot or passage formed at the inner side of the cover, as best shown in Fig. 3.

The box or receptacle $b$ is herein shown as divided into two compartments, $b'$ $b^2$, the portion $b'$ being concealed by the material of the cover $a$, or the box or drawer is completely concealed within the cover, and the portion $b^2$ fills the space shown at $d$, which latter space is covered or concealed by a lid, $d'$, hinged or otherwise secured to the outside of the cover $a$.

The portion $b^2$ of the box or receptacle may contain any suitable book, pamphlet, memoranda, photographs, and the like, which may be accessible by simply raising the lid $d'$, while the contents of the portion $b'$ of the box or receptacle $b$ can only be exposed by withdrawing the box or receptacle at the lower end of the cover.

I claim—

1. As a new article of manufacture, a book-cover having a box or receptacle within it, an opening at the end of the cover to gain access to the said box or receptacle, and a tongue to conceal the opening, substantially as described.

2. As a new article of manufacture, a book-cover having a box or receptacle within it, a lid, as $d'$, to expose the box or receptacle, and a tongue, as $c$, to also expose or gain access to the box or receptacle, substantially as described.

In testimony whereof I have signed my name to this specification in the presence of two subscribing witnesses.

THOMAS KELLY.

Witnesses:
J. HERMAN WAHLERS,
EDW. W. CURTIS.